United States Patent [19]

Kuan

[11] Patent Number: 5,067,739
[45] Date of Patent: Nov. 26, 1991

[54] STRUCTURE OF MOTORCYCLE STAND

[76] Inventor: Chung A. Kuan, No. 32, Village Mei Pu, Tai Pao Hsiang, Chia-I, Taiwan

[21] Appl. No.: 631,497

[22] Filed: Dec. 21, 1990

[51] Int. Cl.$^5$ .............................................. B62H 1/06
[52] U.S. Cl. .................................... 280/304; 180/219; 254/102; 254/103; 254/425; 280/766.1
[58] Field of Search ............... 280/293, 295, 296, 304, 280/763.1, 766.1; 254/102, 103, 425; 212/189; 180/219

[56] References Cited

U.S. PATENT DOCUMENTS 4,817,977  4/1989  Bookbinder .......................... 280/304

FOREIGN PATENT DOCUMENTS 709483   3/1932  France ................................ 254/425
0240385  9/1989  Japan ................................. 280/293

Primary Examiner—Charles A. Marmor
Assistant Examiner—Victor E. Johnson
Attorney, Agent, or Firm—Bacon & Thomas

[57] ABSTRACT

For supporting a motorcycle in place, a motorcycle stand comprising a substantially H-shaped tubular frame defining therein two cylindrical side chambers vertically disposed at two opposite side with a cylindrical cross chamber transversely disposed therebetween, which cross chamber has set therein a transmission gear set to drive two driving bevel gears to rotate, which two cylindrical side chambers have each an extendible support, which is comprised of a socket, a transmission tube, a T-shaped driving rod, a driven screw bolt, a tube-shaped movable coupling, a movable tube and a shoe, driven by said driving bevel gears to extend out of or received inside said two cylindrical side chambers so as to support said motorcycle in place or permit said motorcycle to be driven to move.

1 Claim, 5 Drawing Sheets

STRUCTURE OF MOTORCYCLE STAND

BACKGROUND OF THE INVENTION

1. Field of the Invention

The present invention relates to motorcycle stands, and more particularly relates to a motorcycle stand which comprises two extendible supports disposed at two opposite sides and driven by a transmission gear set to extend out of or received inside the casing thereof so as to firmly support a motorcycle in place or permit a motorcycle to be driven to move.

2. Description of the Prior Art

A motorcycle has been commonly used as a personal transportation vehicle as well as a means for sports. A motorcycle is generally comprised of a stand pivoted to the frame thereof at a lower position. When a motorcycle is not in use, the stand can be rotated downward to support a motorcycle in an oblique position on the ground. However, because a motorcycle is very heavy, it is labor consuming to park it in position. More particularly to a young lady, parking a motorcycle in position is a thing very difficult to handle. Further, according to the conventional structure a motorcycle stand is generally made of a single steel or iron rod for supporting a motorcycle in an oblique position. Therefore, a motorcycle may be easily hit to fall from position when it is parked in place.

SUMMARY OF THE INVENTION

The present invention has been accomplished under the circumstances in view. It is therefore an object of the present invention to provide a motorcycle stand for supporting a motorcycle in position which can be easily operated without consumption of labor.

It is another object of the present invention to provide a motorcycle stand for supporting a motorcycle in position which can stably support a motorcycle in an upright position.

According to one aspect of the present invention a motorcycle stand is comprised of a substantially H-shaped tubular frame defining therein two cylindrical side chambers vertically disposed at two opposite sides with a cylindrical cross chamber transversely disposed therebetween, which cross chamber has set therein a transmission gear set to drive two driving bevel gears to rotate, which two cylindrical side chambers have each an extendible support, which is comprised of a socket, a transmission tube, a T-shaped driving rod, a driven screw bolt, a tube-shaped movable coupling, a movable tube and a shoe, driven by said driving bevel gears to extend out of or received inside said two cylindrical side chambers so as to support said motorcycle in place or permit said motorcycle to be driven to move.

According to another aspect of the present invention, the movable coupling has a raised outer thread portion on the smooth outer wall surface thereof at an upper end and engaged with the inner thread of the transmission tube, an annular projection projecting in the boring bore thereof to support the extended head of the driven screw bolt permitting the driven screw bolt to be driven by the T-shaped driving rod to rotate therein, two elongated inner grooves on the inner surface wall thereof at two opposite locations and respectively engaged with the two opposite projecting strips made on the outer wall surface of the movable tube permitting the movable tube to be rotated downward on the driven screw bolt so as to extend out of the movable coupling, and two elongated outer grooves on the outer wall surface thereof at two opposite locations and respectively engaged with the two opposite projecting strips made on the inner wall surface of the socket at the bottom so that it can be rotated downward to extend out of the transmission tube.

According to still another aspect of the present invention, a flexible dust protective covering is secured between the socket and the shoe to protect the mechanical parts of the motorcycle stand against dust.

BRIEF DESCRIPTION OF THE DRAWINGS

The foregoing and other objects, features and advantages of the present invention will be best understood from the following description, the appended claims and the accompanying drawings in which:

FIG. 1-A is a cross sectional view of the movable coupling thereof;

DETAILED DESCRIPTION OF THE PREFERRED EMBODIMENT

Figure 1:
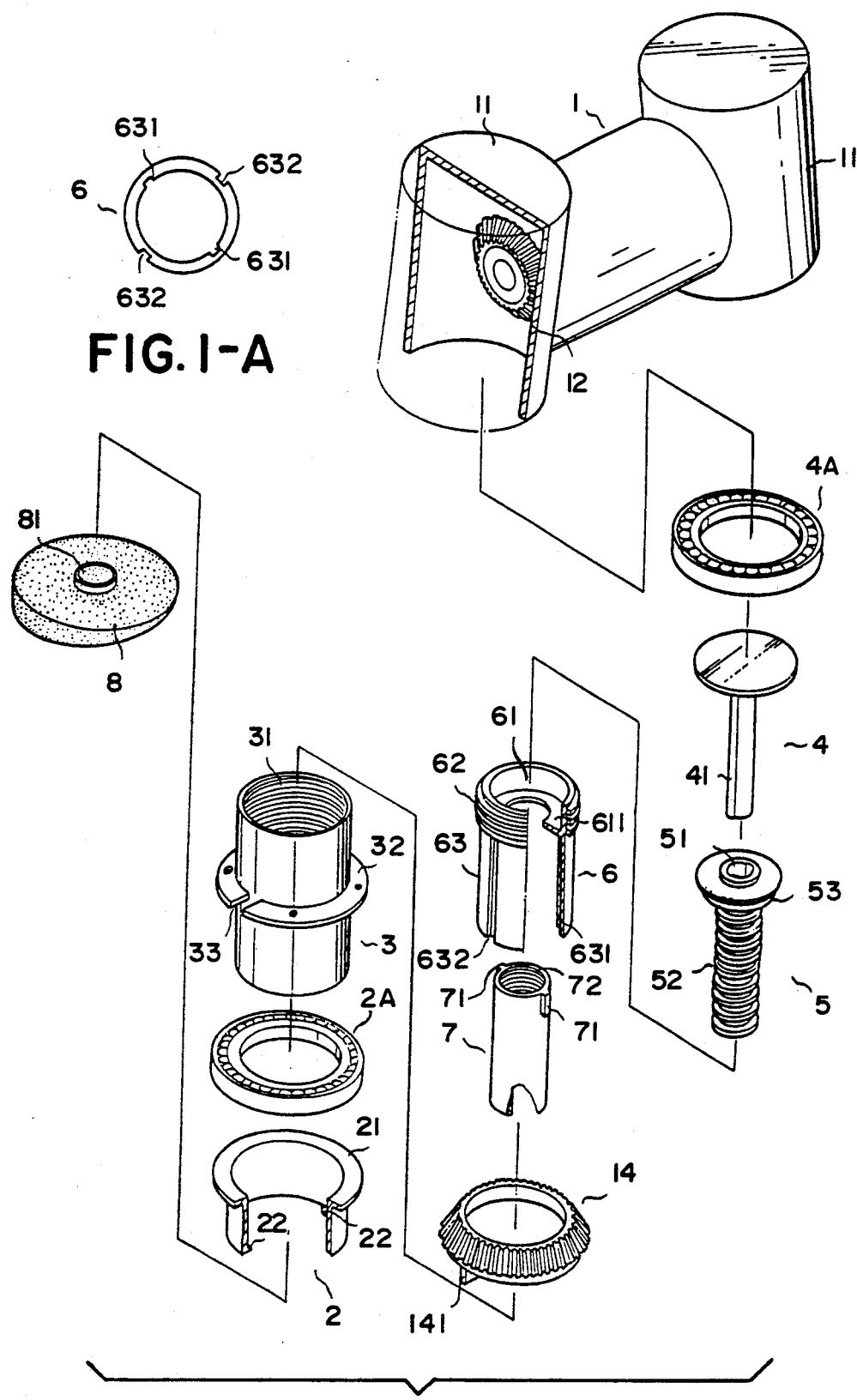
FIG. 1 is a perspective dismantled view of the preferred embodiment of the motorcycle stand of the present invention.
Figure 2:
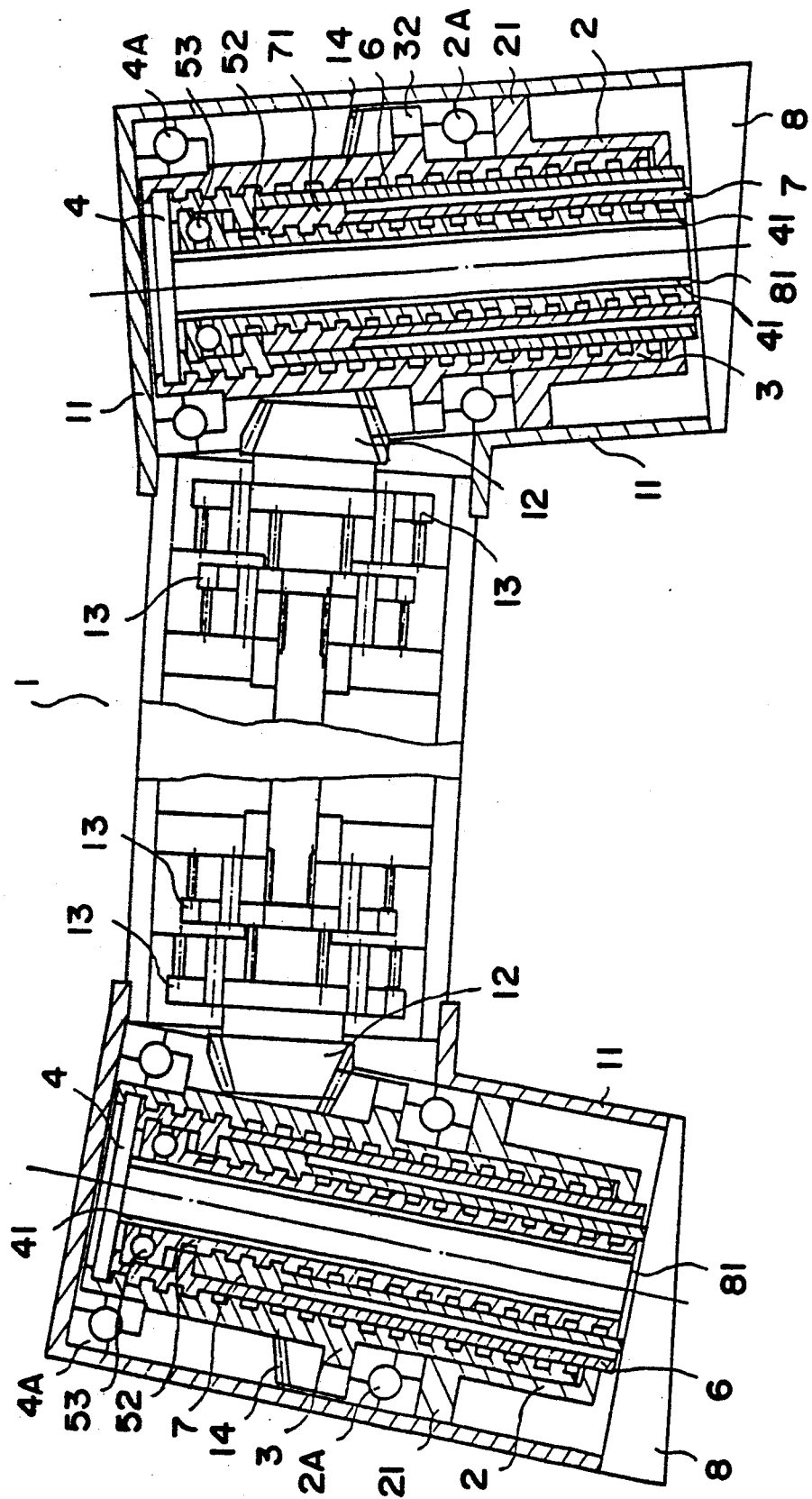
FIG. 2 is a sectional assembly view thereof.
Figure 3:
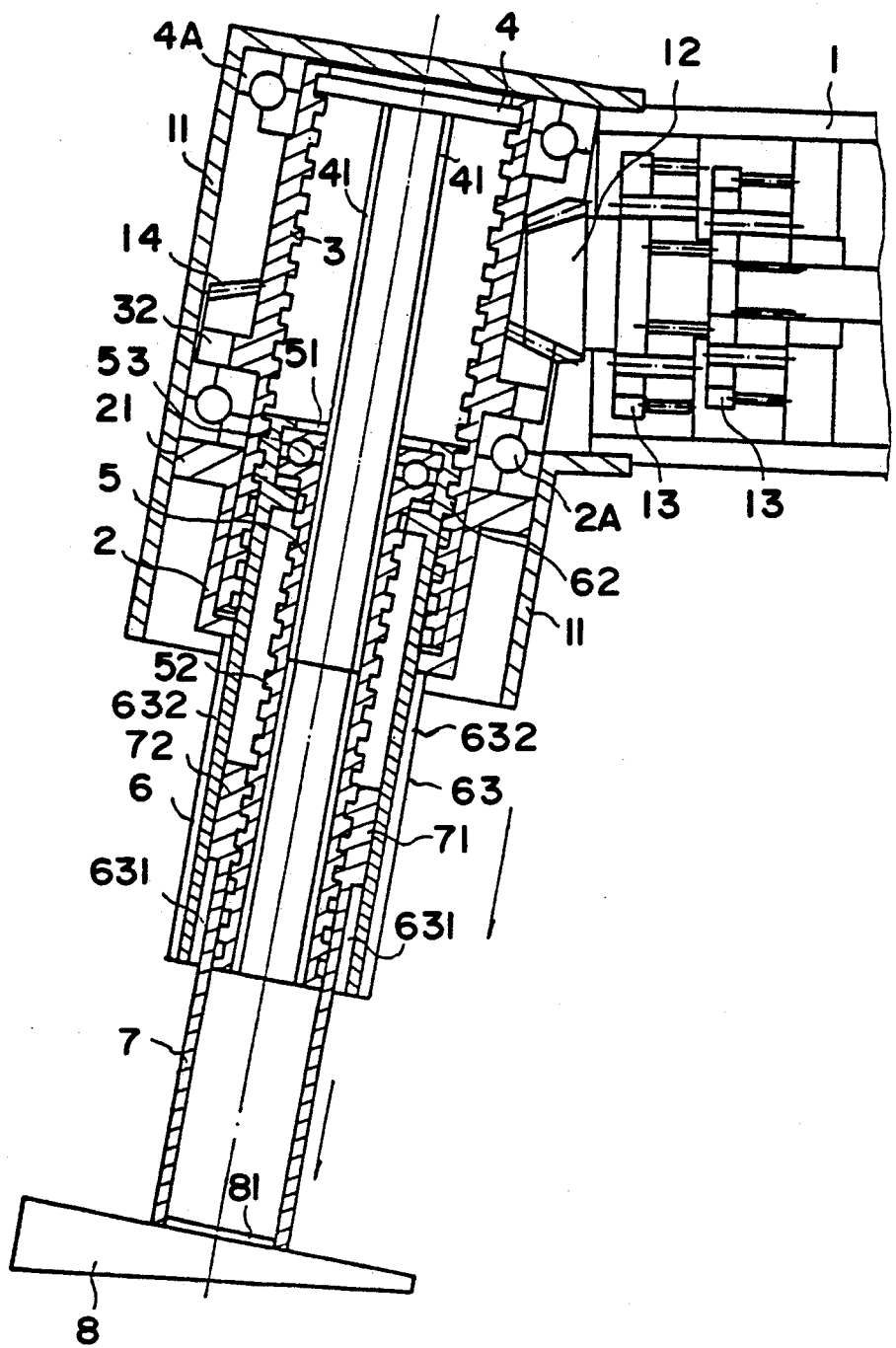
FIG. 3 is a sectional view illustrating the operation of the present invention in extending out the movable coupling and the movable tube thereof.

Referring to FIGS. 1 and 3, a motorcycle stand in accordance with the present invention is generally comprised of a substantially H-shaped tubular frame 1 defining therein two cylindrical chambers 11 vertically disposed at two opposite side with a cylindrical cross chamber 1 transversely disposed therebetween. The cross chamber 1 has fastened therein a transmission gear set 13 to drive two driving bevel gears 12 to rotate, which two driving bevel gears 12 are respectively disposed at two opposite ends between the two cylindrical chambers 11. Inside each cylindrical chamber 11 there is set an extendible support controlled to extend out or receive back by the driving bevel gears 12 through a driven bevel gear 14.

An extendible support in accordance with the present invention is generally comprised of a socket 2, a transmission tube 3, a T-shaped driving rod 4, a driven screw bolt 5, a tube-shaped movable coupling 6, a movable tube 7 and a shoe 8. The socket 2 has an annular top flange 21 projecting outwards at the top for mounting a ball bearing 2A to support the transmission tube 3, and two opposite projecting strips 22 respectively projecting inwards at the bottom. The transmission tube 3 has a collar 32 at the middle and an inner thread 31 on the inner wall surface thereof, which collar 32 has a notch 33 made thereon for mounting a ring-shaped bevel driven gear 14. The ring-shaped bevel driven gear 14 is sleeved on the transmission tube 3, having a vertical plate 141 vertically projecting downward therefrom at a suitable location. After the ring-shaped bevel driven gear 14 is mounted on the transmission tube 3, the vertical plate 141 is inserted in the notch 33 so that it can be driven by the engaged main bevel gear 12 to rotate the transmission tube 3. There is a ball bearing 4A mounted on the top edge of the transmission tube 3 and secured inside the corresponding cylindrical chamber 11 at the top. Therefore, the transmission tube 3 is permitted to rotate on the ball bearing 4A. The T-shaped driving rod 4 is inserted in the driven screw bolt 5, having two unitary, columnar ribs 41 at two opposite sides. The driven screw bolt 5 has a butterfly boring bore 51 through the central axis thereof, and an outer thread 52. By means of inserting the columnar ribs 41 in the butterfly boring bore 51, the driven screw bolt 5 can be driven by the T-shaped driving rod 4 to rotate. The tube-shaped movable coupling 6 has a raised outer thread portion 62 on the smooth outer wall surface 63 thereof, an annular projection 611 projecting in the boring bore 61 thereof, two elongated grooves 631 on the inner surface wall thereof at two opposite locations, and two elongated grooves 632 on the outer wall surface 63 thereof at two opposite locations, wherein the elongated grooves 631 are respectively spaced from the elongated grooves 632 at equal interval. The movable tube 7 has two opposite projecting strips 71 on the outer wall surface thereof at one end, and an inner thread 72 over the inner wall surface thereof. The shoe 8 is made of resilient material in circular shape, having a stub rod 81 at the top center thereof and fastened in the movable tube 7 at an opposite end (opposite to the end where the projecting strips are made).

To assemble the present invention is easy and outlined hereinafter. The transmission tube 3 is inserted through the ball bearing 2A and the socket 2 permitting the ball bearing 2A to be squeezed in between the top flange 21 of the socket 2 and the collar 32 of the transmission tube 3. Then, the ring-shaped driven bevel gear 14 is sleeved on the transmission tube 3 with its vertical plate 141 fastened in the notch 33 of the collar 32. After the T-shaped driving rod 4 is inserted in the butterfly boring bore 51 of the driven screw bolt 5, the driven screw bolt 5 and the T-shaped driving rod 4 are inserted in the boring bore 61 of the movable coupling 6 permitting the bottom edge of the head of the driven screw bolt 5 to be stopped at the top edge of the annular projection 611 of the movable coupling 6 via a bearing 53. Then, the movable tube 7 is inserted in the movable coupling 6 with its two opposite projecting strips 71 respectively engaged in the two inner, elongated grooves 631 of the movable coupling 6 and with its inner thread 72 engaged with the outer thread 52 of the driven screw bolt 5. After the movable tube 7, the driven screw bolt 5 and the T-shaped driving rod 4 are respectively fastened in the movable coupling 6, the movable coupling 6 is inserted in the transmission tube 3, the ball bearing 2A and the socket 2 with its outer thread 62 engaged with the inner thread 31 of the transmission tube 3 and with its two outer, elongated grooves 632 respectively engaged with the two opposite projecting strips 22 of the socket 2.

Figure 4:
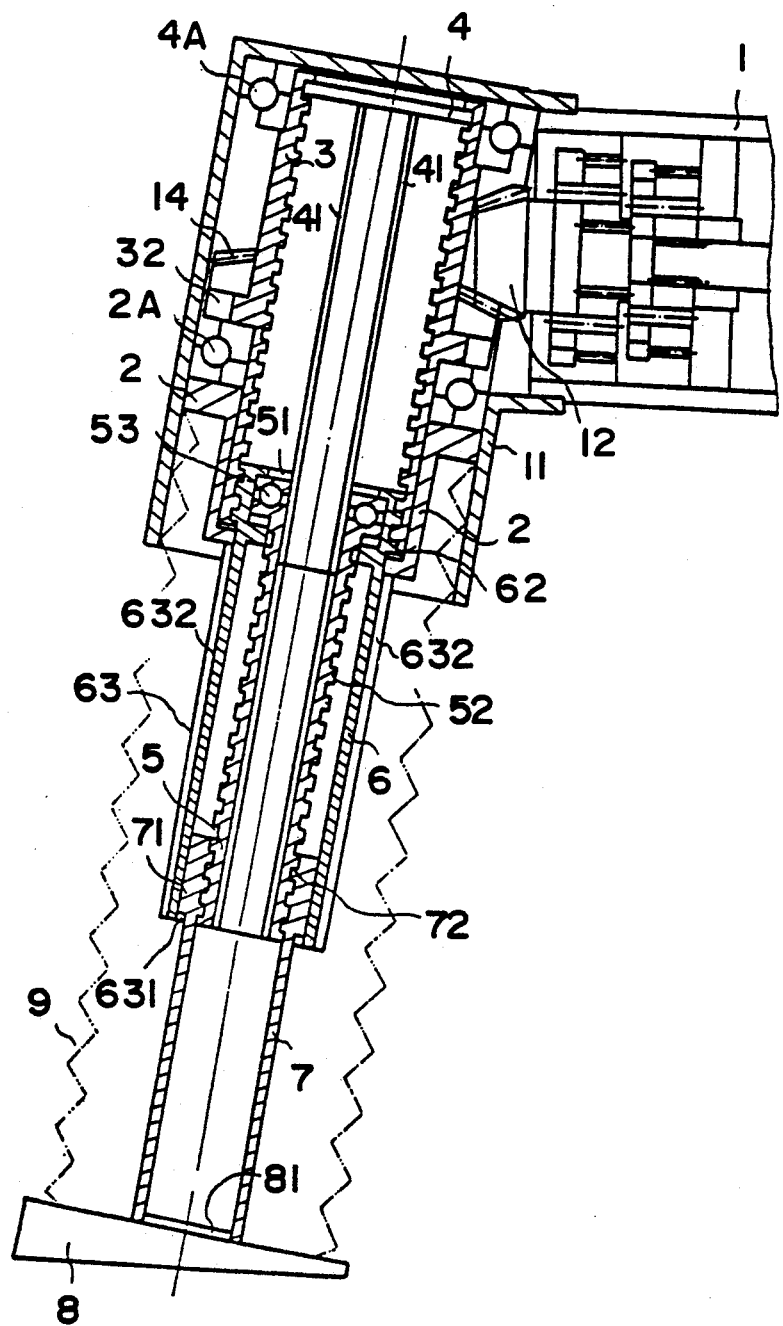
FIG. 4 is a sectional view thereof wherein the movable coupling and the movable tube have been moved to an extended position.
Figure 5:
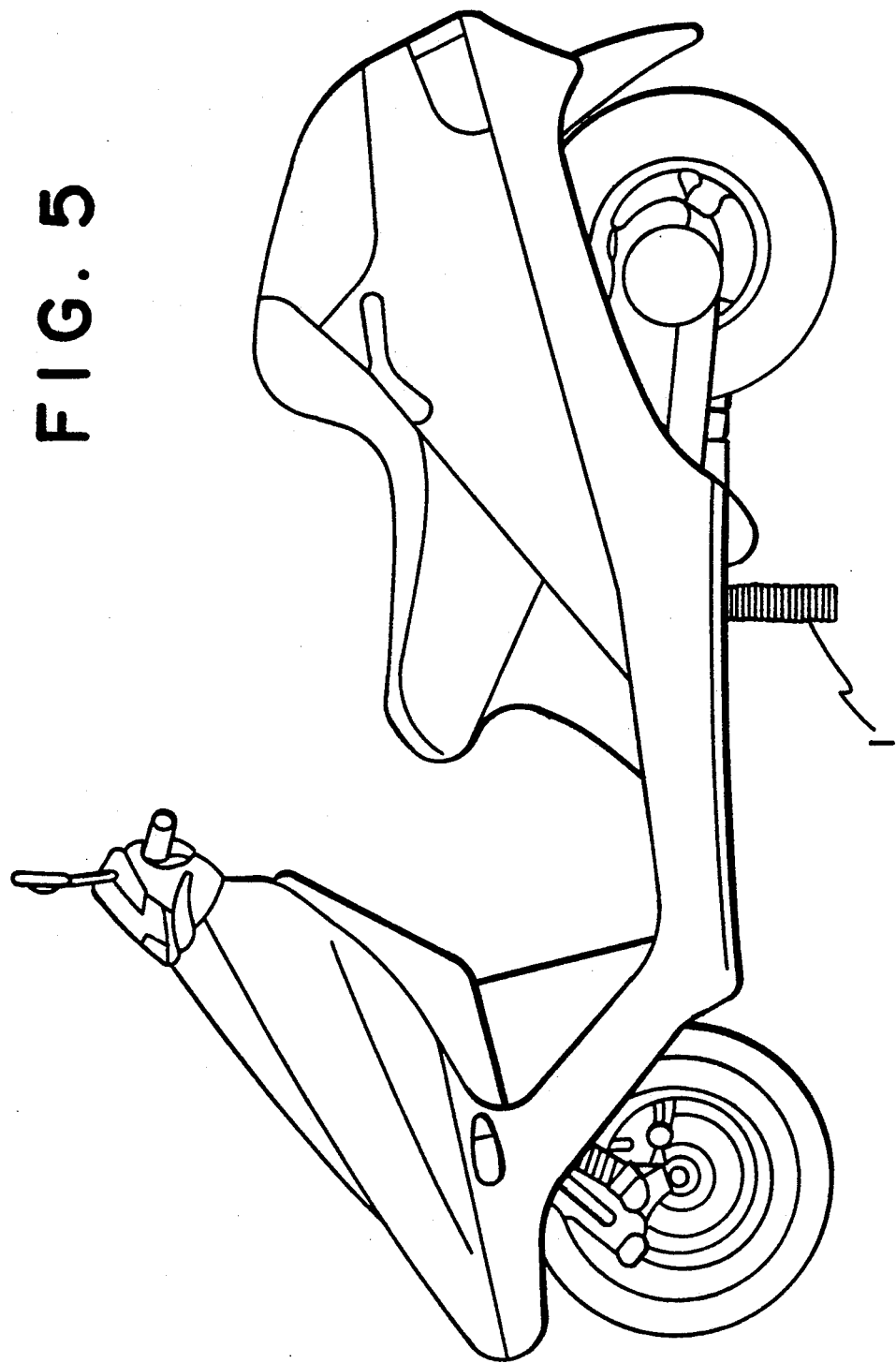
FIG. 5 illustrates the use of the present invention in supporting a motorcycle.

The operation of the present invention is outlined hereinafter with reference to FIGS. 3 and 4 (since the extendible supports in the two cylindrical chambers 11 are identical and commonly driven by the transmission gear set in the cylindrical cross chamber 1, operational explanation is made on the extendible support at one side). When electric circuit is connected, the driving bevel gear is driven to drive the ring-shaped driven bevel gear 14 to rotate, causing the transmission tube 3 to drive the driven screw bolt 5 to rotate via the T-shaped driving rod 4. Because the two opposite projecting strips 22 of the socket 2 are respectively engaged in the two outer elongated grooves 632 of the movable coupling 6, rotation of the transmission tube 3 causes the movable coupling 6 to move downward. Therefore, the movable coupling 6 can be moved to extend out of the socket 2. At the same time, the two opposite projecting strips 71 of the movable tube 7 are confined by the two inner elongated grooves 631, causing the movable tube 7 to extend out of the movable coupling 6 when the driven screw bolt 5 is driven by the T-shaped driving rod 4 to rotate. Further, a flexible dust protective covering 9 may be secured between the socket 2 and the shoe 8 to protect the aforesaid parts against dust. As described above, by means of extending the movable coupling 6 and the movable tube 7 out of the transmission tube 3, the two extendible supports in the two cylindrical chambers 11 are respectively set in an extended position to firmly support the motorcycle in place (see FIG. 5).

I claim:

1. The motorcyle stand, comprising a substantially H-shaped tubular frame defining therein two cylindrical side chambers vertically disposed at two opposite sides with a cylindrical cross chamber transversely disposed therebetween, said cross chamber having set therein a transmission gear set to drive two driving bevel gears to respectively drive two extendible supports to respectively extend out of said two cylindrical side chambers for supporting a motorcycle in place or receive inside said two cylindrical side chambers permitting said motorcycle to be driven to move, wherein said two extendible supports are each comprised of:

a socket having an annular top flange projecting outwards at the top for mounting a ball bearing, and two opposite projecting strips respectively projecting inwards at the bottom;

a transmission tube fastened to the inner top of either one of said two cylindrical side chambers via a ball bearing, having a collar at the middle thereof and carried on the top edge of the ball bearing mounted on said annular top flange, and an inner thread on the inner wall surface thereof, said collar having a notch made thereon;

a ring-shaped bevel driven gear sleeved on said transmission tube and engaged with either one of said two driving bevel gears, having a vertical plate at the bottom thereof and fastened in said notch on said collar for driving said transmission tube to rotate;

a driven screw bolt having a butterfly boring bore through the central axis thereof, an extended head, and an elongated outer thread portion extending downward from said extended head at the center;

a T-shaped driving rod, having two unitary, columnar ribs at two opposite sides respectively engaged in said butterfly boring bore and driven by said transmission tube to carry said driven screw bolt to rotate;

a tube-shaped movable coupling having a raised outer thread portion on the smooth outer wall surface thereof at an upper end and engaged with the inner thread of said transmission tube, an annular projection projecting in the bore thereof to support the extended head of said driven screw bolt permitting said driven screw bolt to be driven by said T-shaped driving rod to rotate inside said tube-shaped movable coupling, two elongated inner grooves on the inner surface wall thereof at two opposite locations, and two elongated outer grooves on the outer wall surface thereof at two opposite locations and respectively engaged with the two opposite projecting strips of said socket;

a movable tube having two opposite projecting strips on the outer wall surface thereof at one end and respectively engaged in the two elongated inner grooves of said tube-shaped movable coupling, and an inner thread over the inner wall surface thereof and engaged with the outer thread portion of said driven screw bolt; and a shoe made of resilient material in circular shape, having a stub rod at the top center thereof and fastened in said movable tube at the bottom.

* * * * *